United States Patent
Tomlinson

[11] 3,833,998
[45] Sept. 10, 1974

[54] METHOD OF FORMING A SPLICE IN A TOOTHED POWER TRANSMISSION BELT

[75] Inventor: Edward G. Tomlinson, Abington Twp., Montgomery County, Pa.

[73] Assignee: Uniroyal, Inc., New York, N.Y.

[22] Filed: May 14, 1973

[21] Appl. No.: 360,243

Related U.S. Application Data

[62] Division of Ser. No. 250,393, May 4, 1972, Pat. No. 3,744,095.

[52] U.S. Cl. ............. 29/401, 29/450, 29/526
[51] Int. Cl. ............. B22d 19/10, B23p 7/00
[58] Field of Search ...... 29/401, 526, 450; 24/31 R, 24/33 K, 38

[56] References Cited
UNITED STATES PATENTS

| | | | |
|---|---|---|---|
| 2,815,568 | 12/1957 | Bianca et al. | 29/526 X |
| 2,987,332 | 6/1961 | Bonmartini | 29/526 |
| 3,123,243 | 3/1964 | Roesch et al. | 29/526 UX |
| 3,310,161 | 3/1967 | Kraft | 198/193 |
| 3,324,991 | 6/1967 | Voss | 24/33 K UX |
| 3,602,364 | 8/1971 | Maglio | 198/193 |
| 3,643,518 | 2/1972 | Semin | 74/234 X |
| 3,664,490 | 5/1972 | Maruyama | 24/31 R X |

FOREIGN PATENTS OR APPLICATIONS 708,461  5/1954  Great Britain ............ 24/33 K Primary Examiner—Charlie T. Moon
Attorney, Agent, or Firm—Steven H. Bazerman, Esq.

[57] ABSTRACT

A splice for toothed power transmission belts having connecting pins for holding the abutting ends of the belt together. The connecting pins each pass through a tooth of the belt in the splice region. The pin is placed in adjacent proximity to the tension cords in the belt so that these reinforcement cords will acquire the load transmitted to the pin. As a result, a stronger and more durable splice is achieved. The above splice may also be used for repairing damaged or worn belts by inserting a new piece of belt having a splice at each end.

5 Claims, 6 Drawing Figures

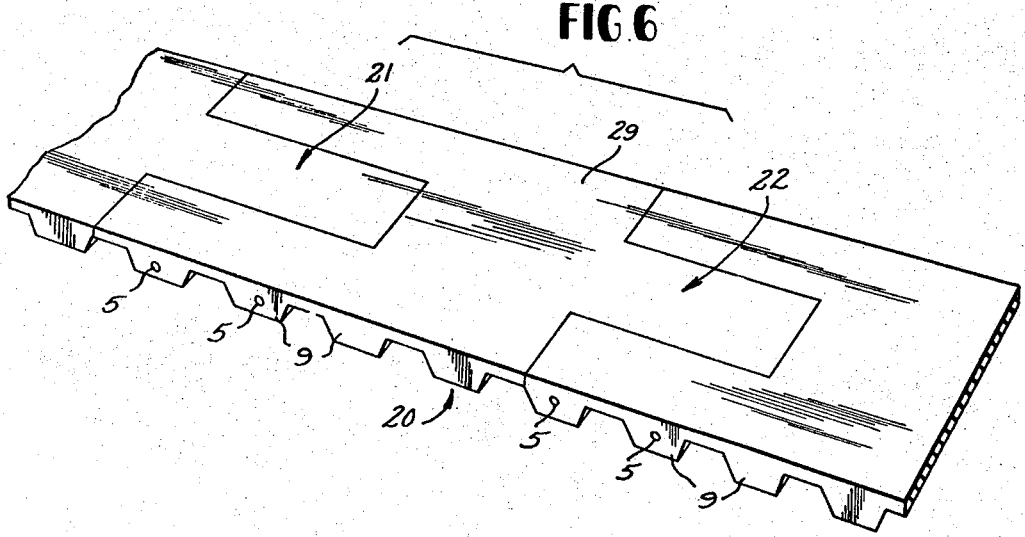

METHOD OF FORMING A SPLICE IN A TOOTHED POWER TRANSMISSION BELT

This is a division of application Ser. No. 250,393, filed May 4, 1972, now Pat. No. 3,744,095.

The invention pertains to belt splicing and more particularly to a novel splice for toothed power transmission belts.

BACKGROUND OF THE INVENTION

The use of interlocking tongue members to secure abutting ends of belt members together is old in the art. Patents illustrating this feature are:

E. L. Liedke, U.S. Pat. No. 277,909, Issued: May 22, 1883;
Harvey Hubbell, U.S. Pat. No. 633,967, Issued: Dec. 18, 1900;
Reeve H. Banks, U.S. Pat. No. 1,638,466, Issued: Aug. 9, 1927; and
Douglas R. Henson, U.S. Pat. No. 2,799,177, Issued: July 16, 1957.

The Hubbell splice is particularly similar to the present splice configuration in that the tongues are dado shaped and held together by a plurality of connecting pins.

The Henson patent is interesting in reference to the present invention in that reinforcing elements are used to strengthen the splice.

The present invention is concerned with a splice for toothed belts having interlocking tongue members and a plurality of connecting pins passing there through. Being a toothed belt, the pins are designed to pass through individual teeth of the belt.

Because it is a primary object of every splice to be as strong as possible, the connecting pins of this invention have been placed in close proximity to the belt tension cords, so that any load transmitted from the tooth of the belt to its respective connecting pin, will be transmitted to the tension cords. This will result in a stronger splice than one where the pins are not so placed.

The present splice differs from the Hubbell patent in that:

a. Hubbell does not use his splice for tooth belts; and b. Hubbell has no tension cords to carry the connecting pin load.

The present splice also differs from Henson in that:

a. Henson is not concerned with tooth belts; and
b. Although Henson has his connecting pins passing through loops of reinforcement cords, the reinforcing cords are of special construction. In other words, a common toothed belt having longitudinally extending tension cords cannot practice the Henson teachings. The present splice, however, requires no special reinforcement, and can readily be used either to join new belts together or to repair old ones in the field.

SUMMARY OF THE INVENTION

The invention is an apparatus and method of forming a strong splice in toothed power transmission belts. Abutting ends of the belt are held together by connecting pins that pass through the belt teeth in the splice region. The pins are placed in adjacent proximity to the tension cords of the belt, so that the load acquired by the pins will be passed on to the cords. This will create a stronger and more durable splice, since the natural belt reinforcement will sustain the splice load.

It is an object of the present invention to provide a splice for toothed power transmission belts;

It is another object of the invention to provide a splice for toothed power transmission belts that is stronger and more durable;

It is but another object of this invention to provide a splice for toothed belts that can be used to join the ends of new belts or to repair old tooth belts in the field.

These and other objects will become more apparent and will be better understood with reference to the following detailed description and accompanying drawings, in which:

FIG. 6 is an isometric view of a repaired section of toothed belting in accordance with the invention as shown in FIG. 1.

Generally speaking, the invention is a splice for a toothed power transmission belt having reinforcement cords running longitudinally along the belt. The splice configuration is of the type featuring interengaging male and female tongues interlocked in abutting ends of the belt. A connecting pin is inserted through a tooth in the splice configuration. The pin extends through the tongues so as to lie transversely across said belt. The pin locks the belt ends together. The connecting pin is disposed in the tooth immediately below and within adjacent proximity to the reinforcement cords. The load experienced by the tooth will be transmitted via the pin inserted therein to the reinforcement cords resulting in a splice of greater load carrying capacity.

Figure 1:
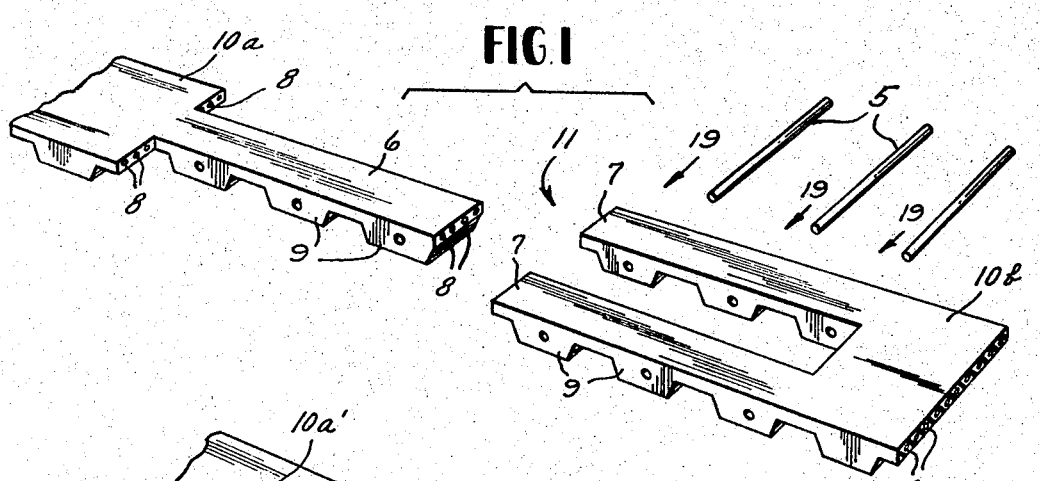
FIG. 1 is an isometric view of a splice in a toothed belt made in accordance with the invention.
Figure 2:
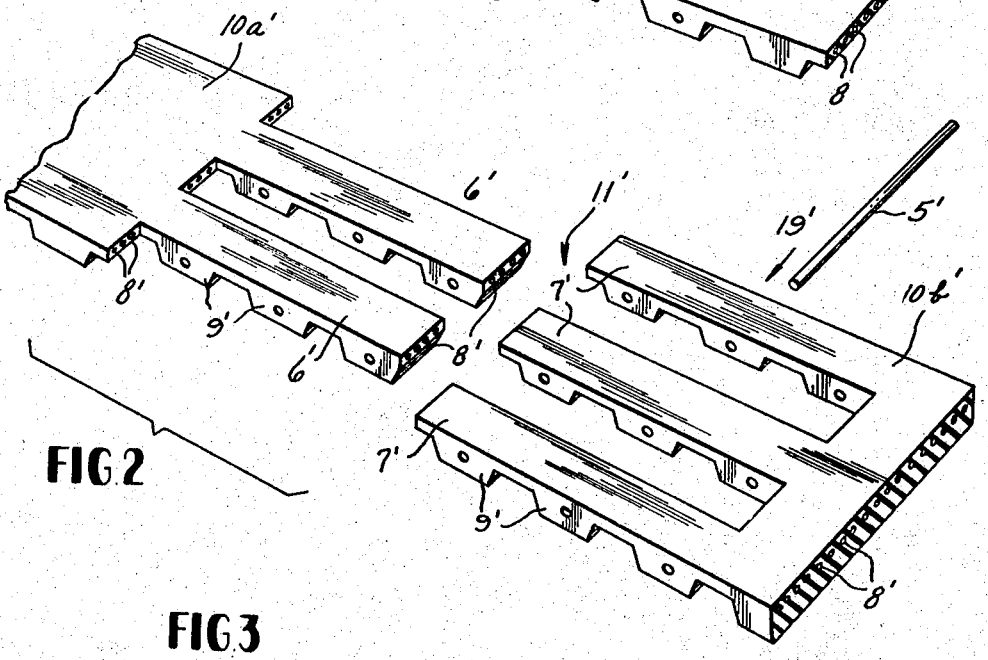
FIG. 2 is an isometric view of an alternate embodiment of the splice of FIG. 1.

Now referring to FIG. 1, two abutting ends 10a and 10b, respectively, of a toothed belt are shown. The belt has teeth 9 running transversely, and reinforcing cords 8 running longitudinally along the belt. The splice configuration, generally referenced by arrow 11, features interlocking male tongue 6 and female tongues 7, respectively. Connecting pins 5 are each inserted through individual tooth members 9 as shown by arrow 19. The connecting pins extend transversely across the belt and lock tongue members 6 and 7 together completing the splice. The splice configuration 11 is commonly referred to as a dado splice. FIG. 2 shows an alternate embodiment to the splice configuration of FIG. 1. The splice configuration is also a dado type splice, but there are five interlocking tongues instead of three as in FIG. 1. All the elements are identical with those of FIG. 1, and are identified by the prime markings next to each numeral designation.

Of course, it is obvious that other male and female splice configurations are possible such as: dovetail, saw tooth, sine wave, etc. The invention is not to be limited to any specific configuration, description or drawings described herein, as they are only meant to give an understanding of how the invention may be practiced. Such description, configurations, drawings, etc., are deemed to be merely exemplary of the invention as will be explained hereinafter.

Figure 5:
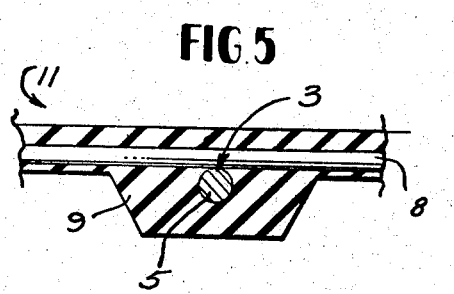
FIG. 5 is a cross-sectional view of a typical tooth within the splice region of FIG. 1.

Referring now to FIG. 5, a cross-section of a tooth 9 is shown within the splice configuration 11 of FIG. 1. The tooth 9 is cut away along the length of the belt to reveal the reinforcement cord 8 running through the belt.

The pin 5 is shown adjacent the cord 8 at point 3. The pin 5 is inserted in close proximity to cords 8 so that any load experienced by the tooth 9 will be carried along pin 5 and transmitted to the reinforcing cords 8. In this way, the splice becomes stronger, since the load is taken up by the tension bearing elements in the belt, the pin should be placed as close to the cords as possible to achieve a good load transfer capability. The pins should not be placed too close, however, as to damage or otherwise sever or cut the cords. The pin should be approximately centered horizontally in the belt tooth so that an equal amount of tooth material surrounds the pin equalizing the pull-out load in either direction. The placement of the pins 5 in the belt may be accomplished in several ways:

a. a hole may be drilled in the tooth having a smaller diameter than the pin 5. The pin is then hammered or otherwise forced into the hole. The purpose of having a force or interference type fit, insures that the pin will not "walkout" of the hole;

b. the pin 5 may be placed in a drill and concurrently forced and rotated into the belt material.

The pin 5 can be made shorter than the transverse width of the belt, so that it will not protrude from the belt and otherwise come in contact with the pulley walls as the belt moves therein. This will prevent the scratching or marring of the pulley walls.

Referring to FIG. 6, a repair splice 20 is shown. A damaged or worn section of the belt has been replaced with a new belt section 29 having a double splice 21 and 22, respectively, at each end thereof. The splice configuration and the placement of the pins 5 is the same as hereinbefore described.

Figure 3:
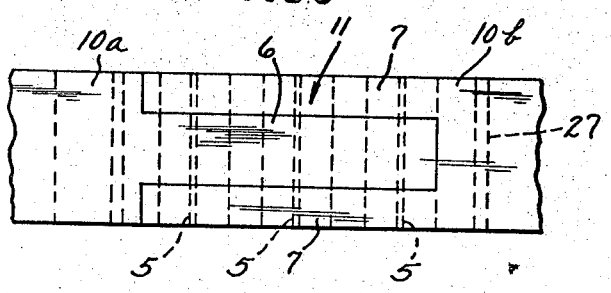
FIG. 3 is a top view of the splice of FIG. 1 with a bottom clamping plate.
Figure 4:
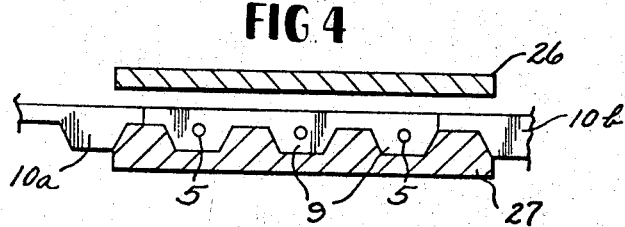
FIG. 4 is a side view of the splice of FIG. 1 with top and bottom clamping plates sandwiching the splice.

FIGS. 3 and 4 illustrate a method of placing the pins 5 in the splice of FIG. 1. Clamping plates 26 and 27, respectively, are used to sandwich the abutting ends 10a and 10b, respectively, of the belt. Clamp 27 fits on the bottom of the belt, and has grooves corresponding to the belt teeth. Clamp 26 fits on top of the splice and is a flat plate. The plates 26 and 27 are for the purpose of holding the splice in place while the connecting pins are driven into the belt.

Of course, many modifications and changes are possible in the invention as will be obvious to those skilled in the art. Such changes are deemed within the purview, spirit and scope of the invention. The invention should be interpreted with respect to the appended claims.

What I claim is:

1. The method of forming a splice in abutting ends of a toothed power transmission belt having reinforcement cords running longitudinally along said belt, comprising the steps of:
   a. forming a splice configuration in the abutting ends of said belt featuring interengaging, interlocking male and female tongues; and then
   b. inserting at least one connecting pin through said tongues so as to transversely extend across said belt and lock said belt ends together, each pin fitting into a respective tooth member within said splice configuration, and disposed immediately below and within adjacent proximity to said reinforcement cords.

2. The method of claim 1, further comprising the step of:
   c. clamping the belt about said splice to hold said belt ends in place prior to inserting the connecting pins into the belt.

3. The method of claim 1, wherein said pins are inserted into the belt by concurrently rotating and forcing said pins into the belt.

4. The method of claim 1, wherein said pins are inserted into the belt by fitting them into holes of a smaller diametrical size.

5. The method of claim 1, wherein said splice may be used to repair a damaged, worn, or broken belt.

* * * * *